Dec. 2, 1924.
F. J. WALLACE
WOOD PLANER FEED CHAIN
Filed April 12, 1923
1,518,029
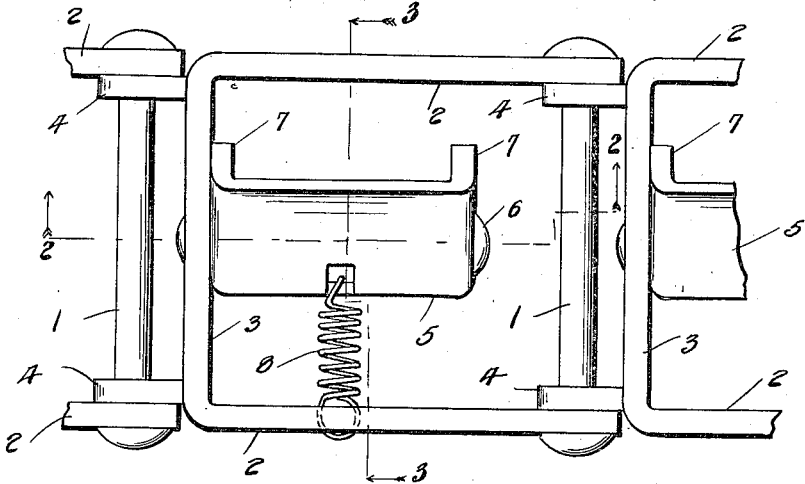
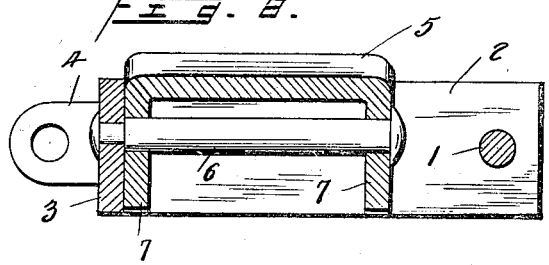
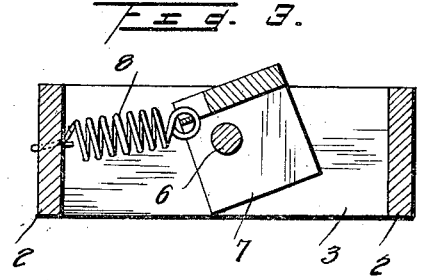
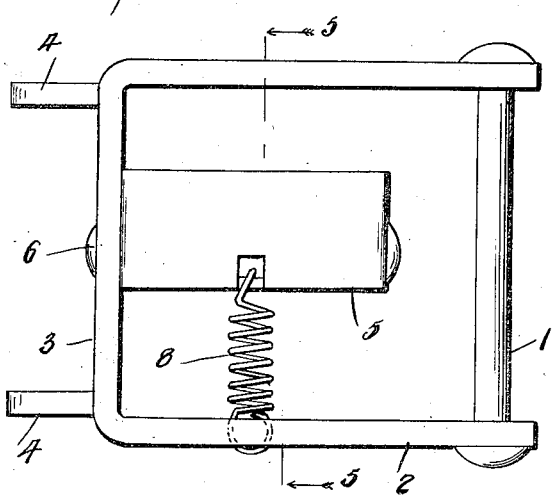
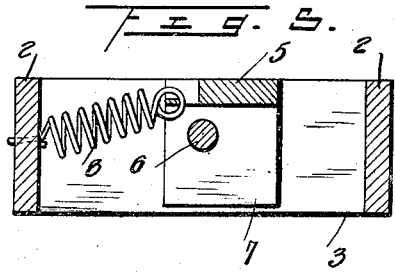
Inventor
F. J. Wallace.
Attorney Patented Dec. 2, 1924.

1,518,029

UNITED STATES PATENT OFFICE.

FRED J. WALLACE, OF ENUMCLAW, WASHINGTON.

WOOD-PLANER FEED CHAIN.

Application filed April 12, 1923. Serial No. 631,597.

*To all whom it may concern:*

Be it known that I, FRED J. WALLACE, a citizen of the United States, residing at Enumclaw, in the county of King and State of Washington, have invented certain new and useful Improvements in Wood-Planer Feed Chains; and I do hereby declare the following to be a full, clear, and exact description of the invention, such as will enable others skilled in the art to which it appertains to make and use the same.

The invention has relation to feed chains for wood-working machinery and more particularly for planers, whereby the feed of lumber is materially assisted, particularly when frozen or rendered slippery by ice or moisture.

The main object of the invention is the provision of a feed chain which positively moves the lumber forward should the feed rolls fail through slipping. This is accomplished by a dog engaging the rear end of the lumber and positively advancing the same.

The invention furthermore pivotally mounts the dog so that the lumber resting thereon turns the dog into inoperative position, a spring returning the dog into normal or operative position when relieved of the weight of the lumber resting thereon.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of a section of feed chain embodying the invention,

Figure 2 is a longitudinal section on the line 2—2 of Figure 1,

Figure 3 is a transverse section on the line 3—3 of Figure 1,

Figure 4 is a top plan view of a link, the dog being turned into the position which it will assume when sustaining the weight of the lumber, not shown, resting thereon, and Figure 5 is a section on the line 5—5 of Figure 4.

Corresponding and like parts are referred to in the following description and designated in the several views of the drawings by like reference characters.

The feed chain comprises a plurality of links which are pivotally connected by means of transverse pins 1. Each of the links comprises side members 2 and a transverse member 3 connecting the side members at one end, the opposite end of the side members being free. The transverse connecting member 3 is formed with forward projections 4. The forward projections 4 enter the space formed between the free ends of the side members 2 of the adjacent link and are pivotally connected thereto by means of the transverse pin 1.

Certain links of the feed chain are provided with a dog 5 which normally projects above the plane of the feed chain, as shown most clearly in Figures 2 and 3, whereby to positively engage the rear end of a plank or other piece of lumber to positively feed the same when the usual feed rolls fail. The dog is mounted upon a pivot 6 and may be of any preferred construction to operate automatically. In the specific construction shown, the dog is formed from a strip or elongated plate having opposite end portions 7 bent laterally in the same direction and pierced to receive the pivot 6 which is longitudinally disposed and secured in the transverse member 3 of the link. A helical spring 8 connects the dog 5 with a side member of the link and normally tends to hold the dog so that a portion thereof projects above the plane of the feed chain to engage the rear end of the lumber and positively advance the same. The normal position of the dog is shown most clearly in Figures 2 and 3.

In practice, the plank or other lumber to be planed is moved laterally to the feed chain and the edge of the lumber coming in contact with one or more dogs 5 of the feed chain turns said dogs which assume the position shown most clearly in Figures 4 and 5 so as to underlap the lumber which rests thereon. Obviously the dog immediately in the rear of the lumber will engage the latter and positively feed the lumber in the event of the usual feed rolls slipping and failing to advance the lumber to the planer rolls.

What is claimed is:

1. A planer feed chain provided in its length with a dog movable on an axis disposed longitudinally of the chain which is adapted to turn to clear the lumber when the latter is moved laterally upon the feed chain and which dog is adapted to engage the rear end of the lumber and positively feed the same when the usual feed mechanism fails to function.

2. A feed chain of the character specified having one or more links provided with a dog movable on an axis disposed longitudinally of the chain which normally projects above the plane of the feed chain and which dog is adapted to yield and underlap the lumber when the same is resting thereon.

3. In a feed chain of the character specified, a dog pivotally mounted upon a link on an axis disposed longitudinally of the chain and normally projecting above the plane of the feed chain and adapted to turn under the weight of the lumber resting thereon, and a spring normally urging the dog into a predetermined position.

4. In a feed chain of the character specified, a pivot disposed longitudinally of the chain and secured to a link intermediate the side members thereof, a dog mounted upon said pivot, and a spring between the dog and one of the side members to normally hold the dog projected and admit of the same yielding so as to underlap an article resting thereon.

In testimony whereof I affix my signature in presence of two witnesses.

FRED J. WALLACE.

Witnesses:
　HOWARD JONES,
　J. O. JOHNSON.